United States Patent
Huber et al.

(10) Patent No.: US 9,694,803 B2
(45) Date of Patent: Jul. 4, 2017

(54) AUTOMATIC PARKING BRAKE FOR BODY MOUNTED BRAKE CYLINDER

(71) Applicant: NEW YORK AIR BRAKE, LLC, Watertown, NY (US)

(72) Inventors: Howard Huber, Black River, NY (US); Robert Neulieb, Theresa, NY (US)

(73) Assignee: NEW YORK AIR BRAKE, LLC, Watertown, NY (US)

( * ) Notice: Subject to any disclaimer, the term of this patent is extended or adjusted under 35 U.S.C. 154(b) by 0 days.

(21) Appl. No.: 14/843,055

(22) Filed: Sep. 2, 2015

(65) Prior Publication Data

US 2016/0159336 A1 Jun. 9, 2016

Related U.S. Application Data

(60) Provisional application No. 62/044,696, filed on Sep. 2, 2014.

(51) Int. Cl.
*B60T 17/16* (2006.01)

(52) U.S. Cl.
CPC .................... *B60T 17/16* (2013.01)

(58) Field of Classification Search
CPC ........ B60T 1/005; B60T 17/08; B60T 17/086; B60T 17/16; F16D 65/54; F15B 15/262; B61H 7/00

See application file for complete search history.

(56) References Cited

U.S. PATENT DOCUMENTS

| 3,238,847 A | | 3/1966 | Moore et al. | |
| 3,272,088 A | * | 9/1966 | Kistler | B60T 17/08 188/152 |
| 3,597,016 A | | 8/1971 | Gachot et al. | |
| 4,080,875 A | * | 3/1978 | Repolovsky | B60T 17/086 92/129 |
| 4,215,767 A | * | 8/1980 | Shirey | B60T 17/081 188/265 |

(Continued)

FOREIGN PATENT DOCUMENTS

| DE | 2348087 | 11/1977 |
| FR | 2259288 | 8/1975 |

OTHER PUBLICATIONS

International Search Report Form PCT/ISA/220, International Application No. 14/843,055, pp. 1-10, Dated Jan. 29, 2016.

*Primary Examiner* — Xuan Lan Nguyen
(74) *Attorney, Agent, or Firm* — Bond Schoeneck and King PLLC; David Nocilly

(57) ABSTRACT

A parking brake for a body mounted brake cylinder having either a single locking mechanism cooperates with a threaded shaft that is centrally mounted within the brake cylinder or with multiple locking mechanisms that are positioned symmetrically about the centerline of the brake cylinder push rod so that the push or piston rod can still accommodate arcuate motion of the level of the braking system. The locking mechanism may be controlled by a mechanical linkage or through a pneumatic circuit. Activation of the locking mechanisms prevents axial movement of the brake piston. As a result, engagement of the locking mechanism may be used to prevent a release of the brakes after then have been applied to provide an automatic parking brake.

3 Claims, 11 Drawing Sheets

(56) References Cited

U.S. PATENT DOCUMENTS

| | | | |
|---|---|---|---|
| 4,480,531 A * | 11/1984 | Mylius | B60T 17/086 |
| | | | 92/129 |
| 4,785,718 A * | 11/1988 | Hata | B60T 17/086 |
| | | | 92/130 A |
| 5,402,866 A | 4/1995 | Naedler et al. | |
| 6,186,284 B1 | 2/2001 | Sauter et al. | |
| 7,163,090 B2 | 1/2007 | Huber, Jr. et al. | |
| 7,377,370 B2 | 5/2008 | Huber, Jr. et al. | |
| 8,230,985 B2 * | 7/2012 | Sommerfeld | B60T 13/24 |
| | | | 188/107 |

* cited by examiner

AUTOMATIC PARKING BRAKE FOR BODY MOUNTED BRAKE CYLINDER

CROSS-REFERENCE TO RELATED APPLICATIONS

The present application claims priority to U.S. Provisional Application No. 62/044,696, filed on Sep. 2, 2014.

BACKGROUND OF THE INVENTION

1. Field of the Invention

The present invention relates to rail car braking systems and, more particularly, to an automatic parking brake that may be used with body mounted brake cylinders.

2. Description of the Related Art

Most rail vehicles have a manually-operated parking brake that applies the wheel brakes. Unfortunately, this requires that an operator manually apply the brake on each rail car in a train. As a result, an automatic parking brake, such as that disclosed in U.S. Pat. No. 7,163,090, has been developed that will retain the braking system of any rail car equipped with the brake in the brakes applied position if brake pipe pressure is removed from a locking mechanism position about the shaft of the brake cylinder. Body mount brake cylinders are typically constructed with a hollow rod affixed to the piston and apply the brake force to the brake rigging by means of a push rod inside the hollow rod. This arrangement accommodates angular misalignment of the push rod as the connected brake lever operates through an arc, and decouples the manual hand brake from the body mount cylinder when the cylinder is released and the hand brake applies. In this condition, the hand brake acts on the same brake rigging as the body mount brake cylinder. In the hand brake applied position, the rigging pulls the body mount brake push rod independent of the brake piston, allowing the brake piston to remain in the released position, and decouples the influence of the body mount brake cylinder return spring from the hand brake application. Accordingly, there is a need for an automatic parking brake that can be used with body mounted braking systems while still using a hollow rod, or the same functionality as a hollow rod, so that the piston rod can still accommodates angular misalignment as the connected brake lever operates through an arc.

BRIEF SUMMARY OF THE INVENTION

The present invention comprises an automatic parking brake configured for use with a body-mounted brake cylinder so that the push rod connected to the braking system can still pivot relative to the piston as the lever of the braking system moves through an arc as the brakes are applied and released.

In one example, the body mounted brake cylinder has a piston positioned in the brake cylinder that is moveable in response to the application of pressure to a port between a first position and a second position. A piston/push rod is positioned in abutting relation to the piston for longitudinal movement therewith and for pivoting of the piston rod as the piston moves between the first and second positions. A threaded shaft is coupled to the piston and encloses the piston rod. An automatic parking brake locking mechanism coupled to the threaded shaft for preventing movement of the threaded shaft in response to an application of brake pipe pressure to the automatic parking brake locking mechanism. The automatic parking brake locking mechanism comprises a rotatable locking nut positioned around the threaded shaft and a locking sleeve that is moveable between a locked position, where the locking sleeve engages the locking nut and prevents from the nut from rotating, and a released position, where the locking sleeve is disengages from the locking nut and the locking nut is free to rotate. The automatic parking brake locking mechanism further comprises a spring providing a force biasing the locking nut into the locked position and wherein the application of brake pipe pressure will bias the locking sleeve into the released position if the application of brake pipe pressure exceeds the force of the spring.

In another example, the body mounted brake cylinder comprises a piston positioned in the brake cylinder and moveable in response to the application of pressure to a port between a first position and a second position. A threaded shaft is coupled at a first end to the piston and a piston rod is connected to a second end of the threaded shaft for pivotal movement relative thereto as the piston moves between the first and second positions. An automatic parking brake locking mechanism is coupled to the threaded shaft for preventing movement of the threaded shaft in response to an application of brake pipe pressure to the automatic parking brake locking mechanism. The automatic parking brake locking mechanism has a rotatable locking nut positioned around the threaded shaft and a locking sleeve that is moveable between a locked position, where the locking sleeve engages the locking nut and prevents from the nut from rotating, and a released position, where the locking sleeve is disengages from the locking nut and the locking nut is free to rotate. The automatic parking brake locking mechanism also has a spring providing a force biasing the locking nut into the locked position and the application of brake pipe pressure will bias the locking sleeve into the released position if the application of brake pipe pressure exceeds the force of the spring.

In a further example, the body mounted brake cylinder has a piston positioned in the brake cylinder and moveable in response to the application of pressure to a port between a first position and a second position. A piston rod is positioned in abutting relation to the piston for longitudinal movement therewith and for pivoting of the piston rod as the piston moves between the first and second positions. A central shaft is coupled to the piston and encloses the piston rod. A plurality of threaded shafts are positioned equidistantly about the central shaft and coupled to the piston for movement therewith. A corresponding plurality of automatic parking brake locking mechanisms are coupled to the plurality of threaded shafts for preventing movement of the plurality of threaded shafts. The automatic parking brake locking mechanism has a rotatable locking nut positioned around the threaded shaft and a locking sleeve that is moveable between a locked position, where the locking sleeve engages the locking nut and prevents from the nut from rotating, and a released position, where the locking sleeve is disengages from the locking nut and the locking nut is free to rotate. The automatic parking brake locking mechanism also has a spring providing a force biasing the locking nut into the locked position and wherein the application of brake pipe pressure causes a biasing of the locking sleeve into the released position. A brake pipe pressure activating assembly is used for biasing the locking sleeve into the released position, and the brake pipe pressure activing assembly includes a second piston moveable between a first position and a second position in response to the application brake pipe pressure to a face of the piston. In one embodiment, the brake pipe pressure activing assembly comprises a plurality of cams, each of which is associated with each of the plurality of the automatic parking brake locking mechanisms and the second piston is interconnected to the plurality of cams so that movement of the second piston between the first position and the second position causes movement of each of the plurality of cams into each of the locking sleeves of the plurality of automatic parking brake locking mechanisms such that each of the corresponding locking sleeves are moved into the unlocked positions. In another embodiment, the brake pipe pressure activing assembly comprises a plurality of conduits extending from the second piston to each of the plurality of the automatic parking brake locking mechanisms. As a result, movement of the second piston between the first position and the second position causes pressure to be applied through the plurality of conduits to the locking sleeves of the plurality of automatic parking brake locking mechanisms such that each of the corresponding locking sleeves are moved into the unlocked positions.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
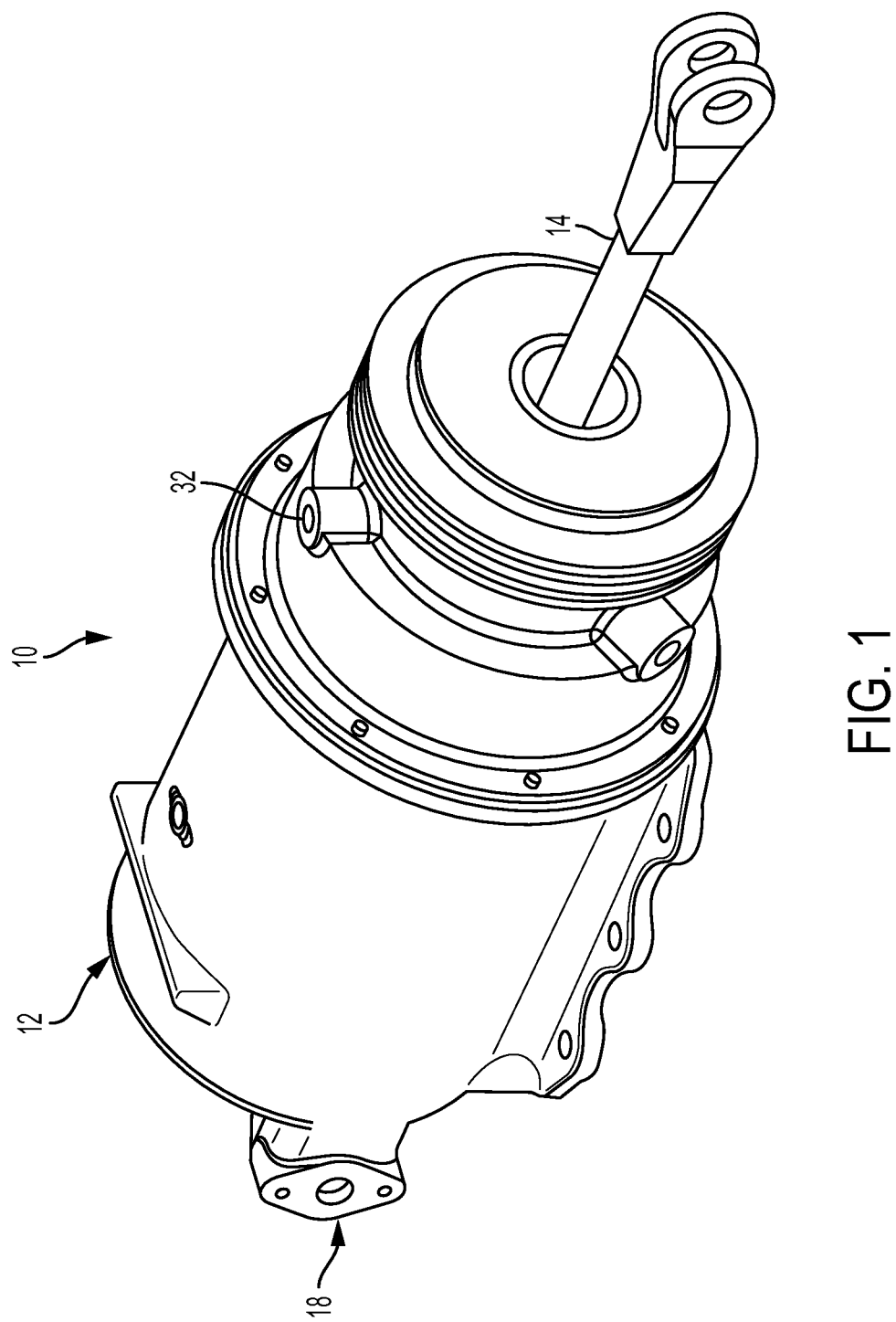
FIG. 1 is a perspective view of an automatic parking brake for a body mounted brake cylinder.
Figure 2:
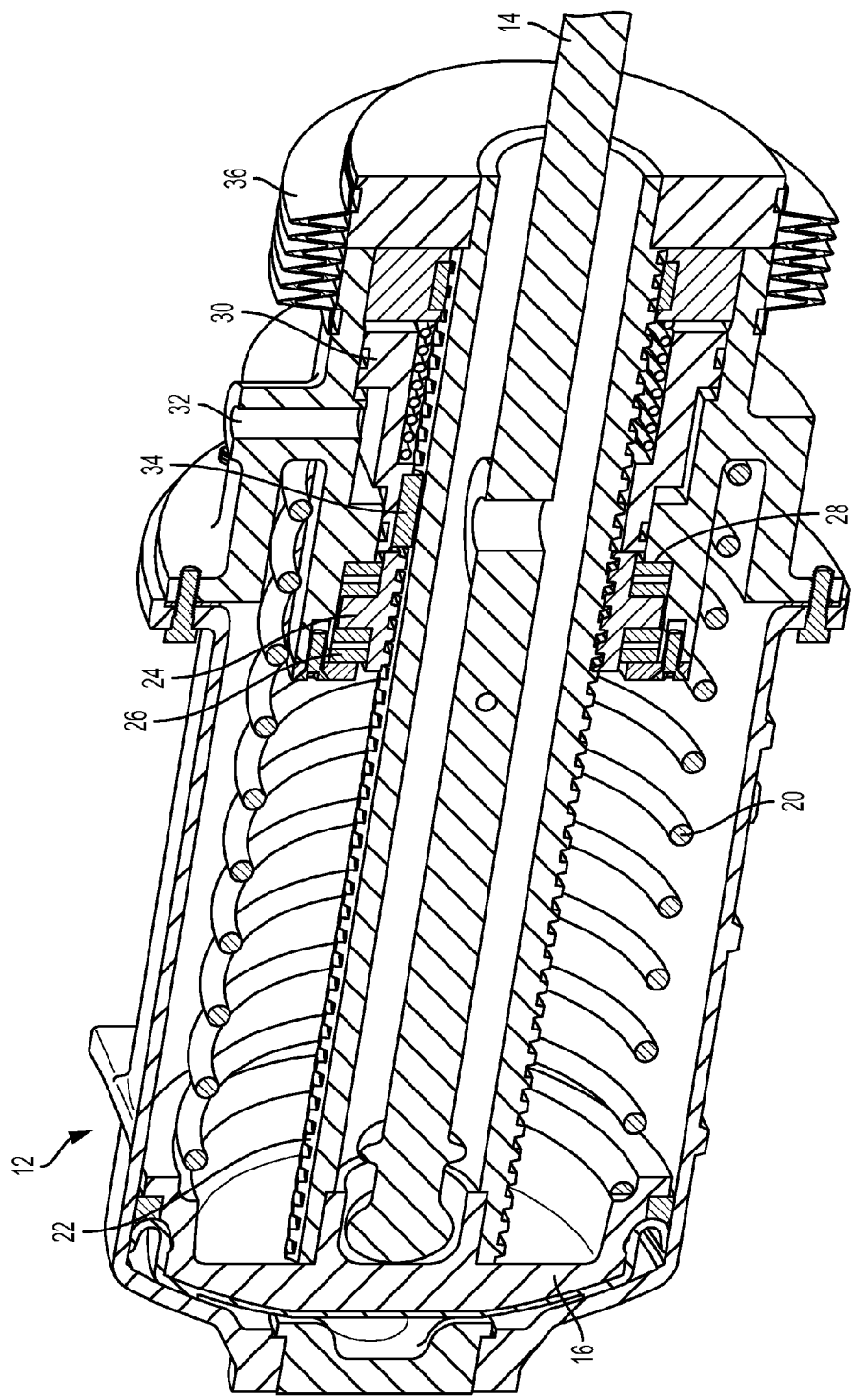
FIG. 2 is a cross-section of an automatic parking brake for a body mounted brake cylinder.

Referring now to the drawings, wherein like reference numerals refer to like parts throughout, there is seen in FIGS. 1 and 2 a first embodiment of an automatic parking brake 10 interconnected to the non-pressure head of a body mounted brake cylinder 12. Brake cylinder 12 includes a piston 16 that moves in response to pneumatic pressure applied to an inlet 18, such as a source of brake cylinder pressure. A spring 20 biases piston 16 into a brakes released position, and pressure applied to inlet 18 moves piston 16 into the brakes applied position. A piston rod 14 is pushably coupled to the piston 16 at one end and is connected to the braking system at the other end to apply the brakes of a rail car. A threaded shaft 22 having a hollow cavity is also coupled to piston 16 and extends axially around piston rod 14 for movement therewith. Piston rod 14 connected to piston 16 such that piston rod 14 is free to pivot relative to piston 16 within the bounds of the inside of threaded shaft 22 to accommodate angular misalignment of piston rod 14 as the brake lever of the braking system to which piston rod 14 in connected operates through an arc.

Threaded shaft 22 is selectively locked and unlocked by the action of a locking nut 24 positioned between two thrust bearings 26 and 28 and threaded to shaft 22 via high helix threads, and a locking sleeve 30 that is rotationally fixed but free to move into and out of engagement with locking nut 24. When engaged with nut 24, locking sleeve 30 prevents nut 24 from rotating, and thereby locking shaft 22 in place. When sleeve 30 is disengaged from nut 24, nut 24 is free to rotate, thereby allowing shaft 22 to translate between the brakes applied and brakes released position. Sleeve 30 is biased into engagement with nut 24 and a pressure port 32, which is preferably connected to a source of brake pipe pressure, allows pressure to be applied directly to sleeve 30 to move it out of engagement with nut 24. As a result, the removal of brake pipe pressure after the application of brake cylinder pressure will automatically lock brake cylinder 12 in the brakes applied position, and the restoration of brake pipe pressure will release automatic parking brake 10. A pin 34 may be positioned between a shoulder 34 of sleeve 30 and nut 24 and, more particularly, in a groove formed in shaft 22, to prevent rotation of sleeve 30 about shaft 22. A protective boot 36 may be positioned about the end of shaft 22 to protect against outside elements.

Figure 3:
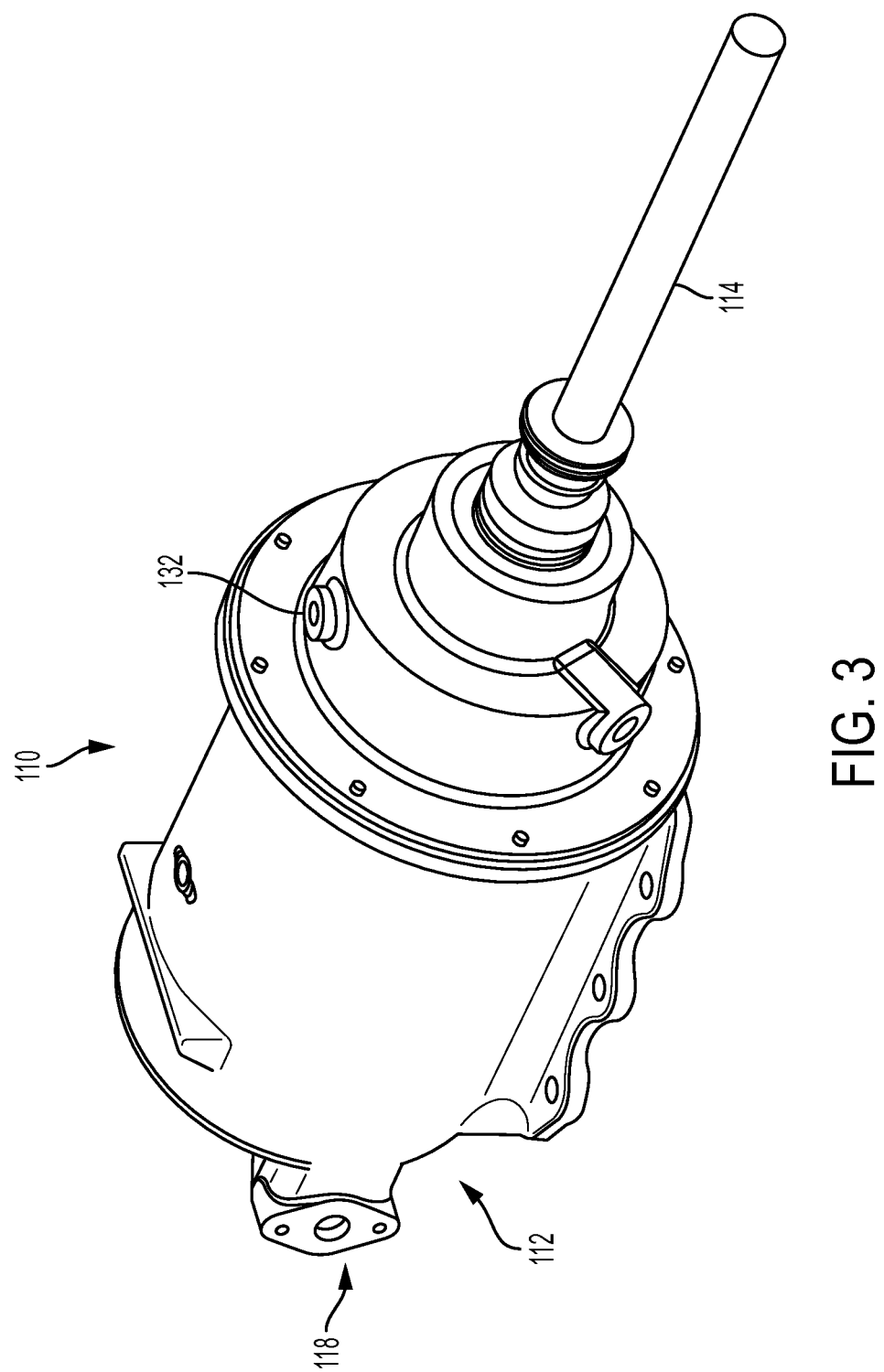
FIG. 3 is a perspective view of another automatic parking brake for a body mounted brake cylinder
Figure 4:
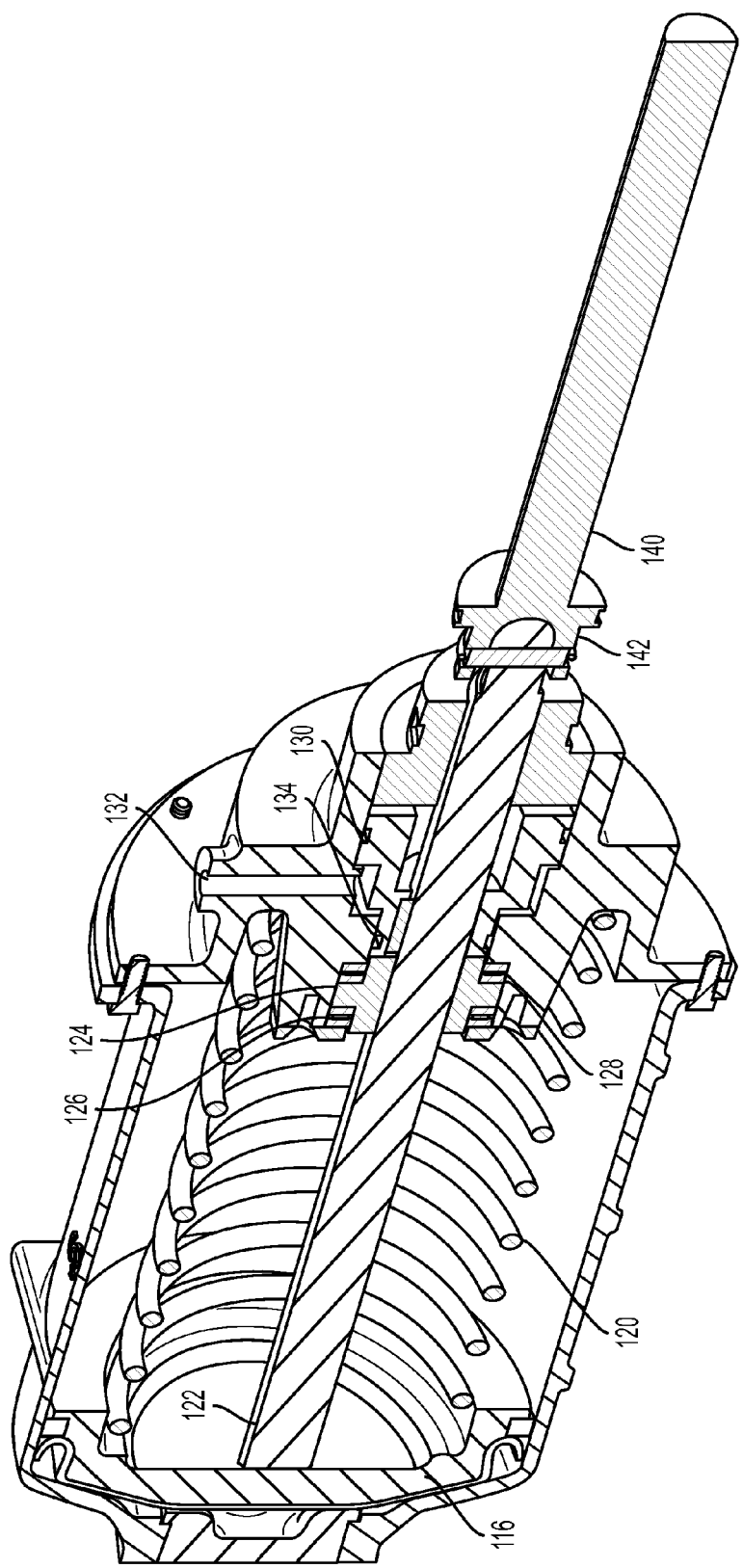
FIG. 4 is a cross-section of the automatic parking brake for a body mounted brake cylinder seen in FIG. 3.

There is seen in FIGS. 3 and 4 another embodiment of an automatic parking brake 110 interconnected to the non-pressure head of a body mounted brake cylinder 112. Brake cylinder 112 includes a piston 116 that moves in response to pneumatic pressure applied to an inlet 118, such as a source of brake cylinder pressure. A spring 120 biases piston 116 into a brakes released position, and pressure applied to inlet 118 moves piston 116 into the brakes applied position. A threaded shaft 122 is coupled to the piston 116 at one end and is interconnected to the braking system at the other end via a connecting rod 140 that is connected to threaded shaft 122 by a ball joint 142. The push rod (not shown) of a conventional braking system may be positioned over connecting rod 140. Threaded shaft 122 is selectively locked and unlocked by the action of a locking nut 124 positioned between two thrust bearings 126 and 128 and threaded to shaft 120 via high helix threads, and a locking sleeve 130 that is rotationally fixed but free to move into and out of engagement with locking nut 124. When engaged with nut 124, locking sleeve 130 prevents nut 124 from rotating, and thereby locking shaft 120 in place. When sleeve 130 is disengaged from nut 124, nut 124 is free to rotate, thereby allowing shaft 120 to translate between the brakes applied and brakes released position. Sleeve 130 is biased into engagement with nut 124 and a pressure port 132, which is preferably connected to a source of brake pipe pressure. Pressure port 132 allows pressure to be applied directed to sleeve 130 to move it out of engagement with nut 124. As a result, the removal of brake pipe pressure after the application of brake cylinder pressure will automatically lock brake cylinder 112 in the brakes applied position, and the restoration of brake pipe pressure will release automatic parking brake 110. A pair of pins 134 may positioned between a shoulder 134 of sleeve 130 and nut 124. A protective boot may be is positioned about shaft 122 to protect against outside elements.

Figure 5:
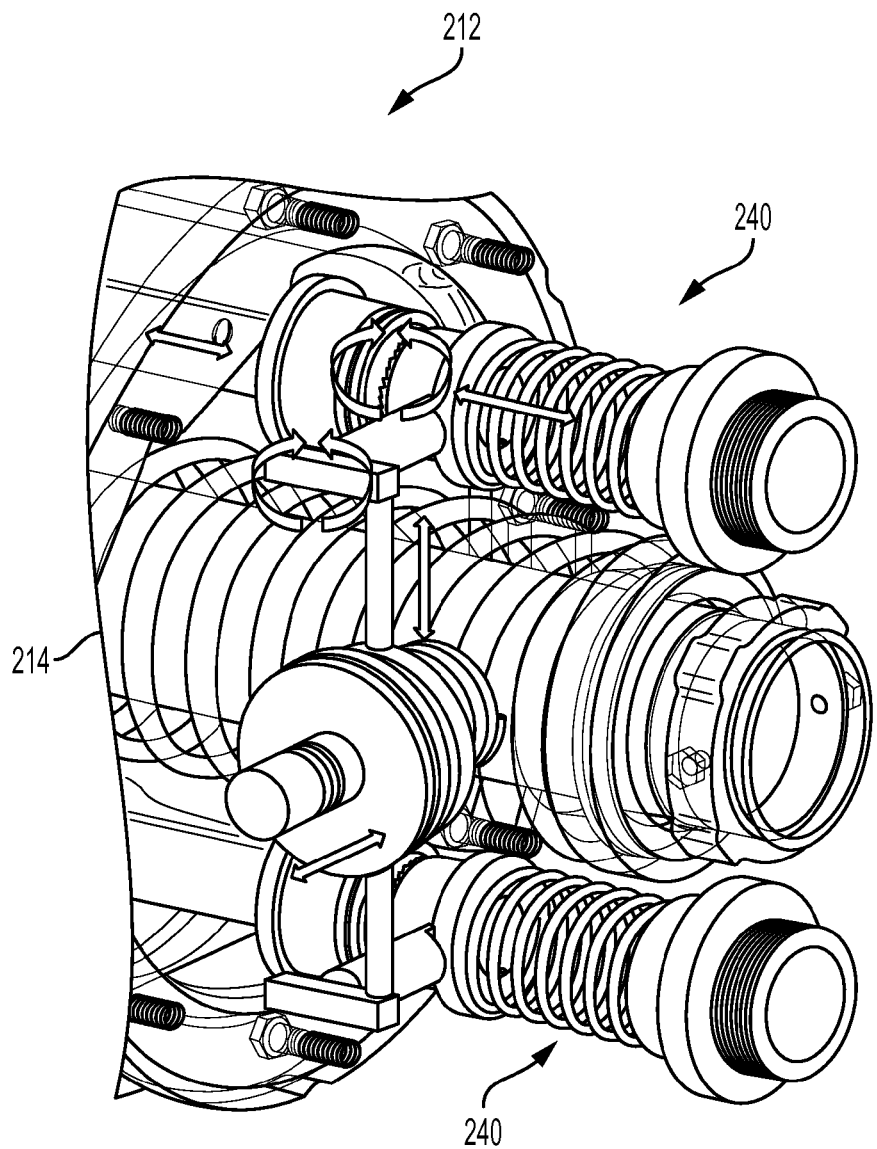
FIG. 5 is a perspective view of a further automatic parking brake for a body mounted brake cylinder.
Figure 6:
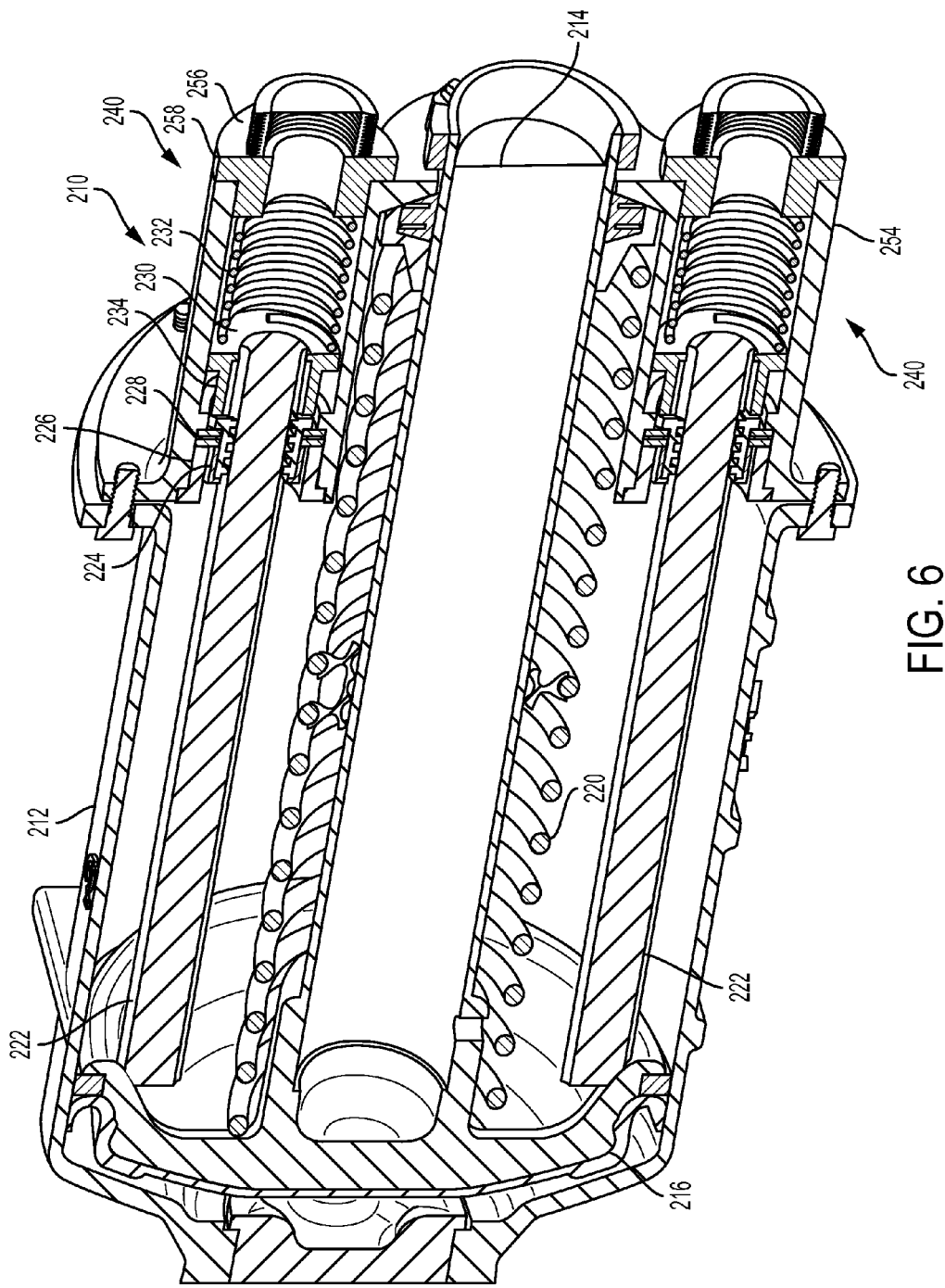
FIG. 6 is a cross-section of the automatic parking brake for a body mounted brake cylinder see in FIG. 5.
Figure 7:
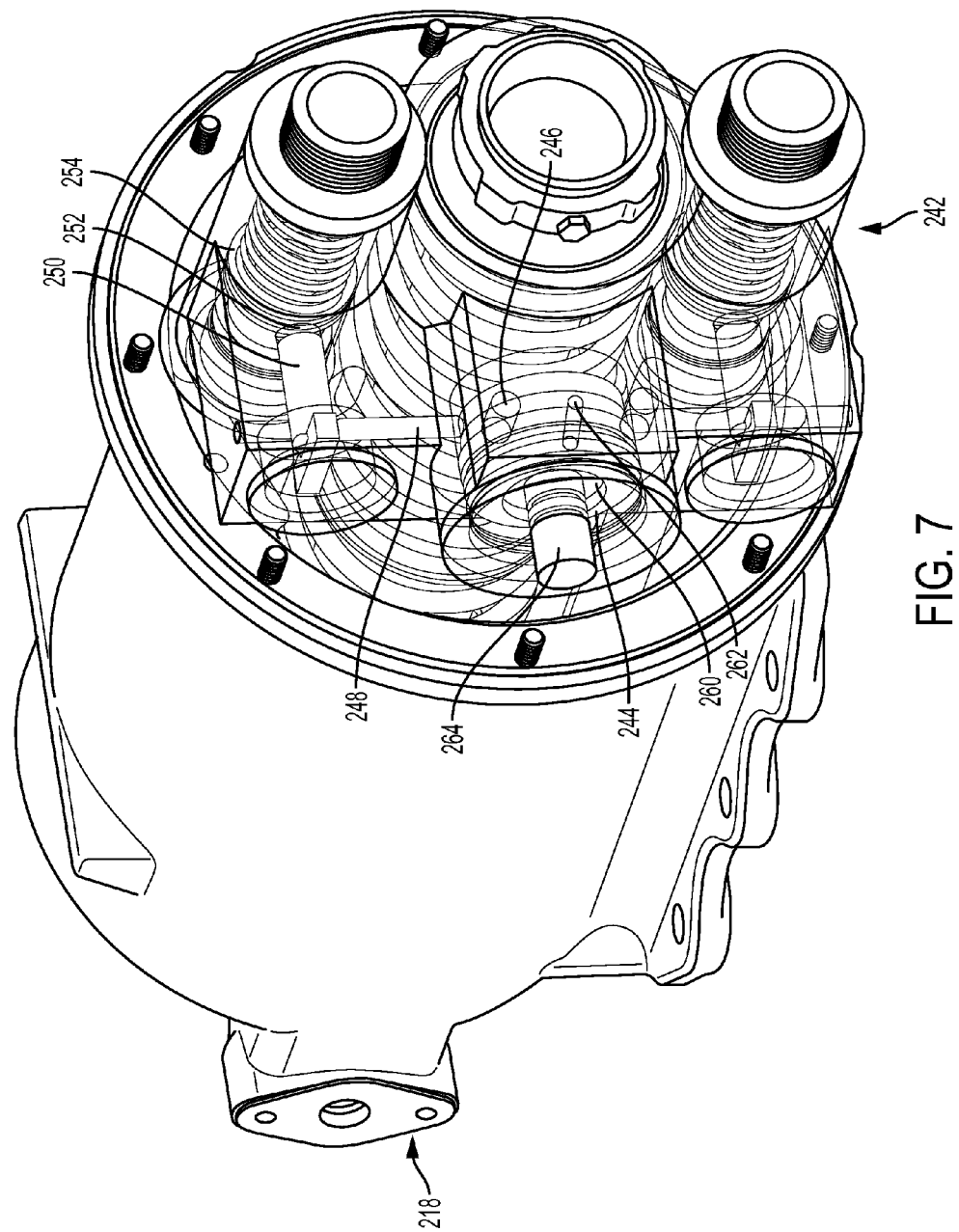
FIG. 7 is a perspective view of the automatic parking brake for a body mounted brake cylinder seen in FIGS. 5 and 6.

There is seen in FIGS. 5 through 7, another embodiment of an automatic parking brake 210 for a body mounted brake cylinder 212 having a pair of locking assemblies 240 oriented symmetrically about the centerline of the push rod, thereby preventing the piston from tipping when the brake force is applied through locking assemblies 240. Although a configuration with two locking assemblies 240 is disclosed, any number greater than one could be utilized, provided that the locking assemblies 240 are oriented symmetrically about centerline of the push rod. Brake cylinder 212 includes a piston 216 that moves in response to pneumatic pressure applied to an inlet 218, such as a source of brake cylinder pressure. A spring 220 biases piston 216 into a brakes released position, and pressure applied to inlet 218 moves piston 216 into the brakes applied position. A piston rod 214 is coupled to the piston 216 at one end and is interconnected to the braking system at the other end.

Each locking assembly 240 comprises a threaded shaft 222 coupled to piston 216 and positioned in parallel with piston rod 214. Threaded shaft 222 is selectively locked and unlocked by the action of a locking nut 224 that is threaded to shaft 222 via high helix threads. A locking sleeve 230 is positioned proximately to locking nut 224 and is rotationally fixed but free to move axially into and out of engagement with locking nut 224. Locking nut 224 is held in place by a bushing 226 and a thrust bearing 228. Locking sleeve 230 is biased into engagement with each locking nut 224 by a spring 232. When engaged with nut 224, locking sleeve 230 prevents nut 224 from rotating, and thereby locking shaft 222 in place. When each sleeve 230 is disengaged from each nut 224, each nut 224 is free to rotate, thereby allowing each shaft 222 to translate between the brakes applied and brakes released position. Pins 234 may be used to prevent rotation of sleeve 230. Each locking assembly 240 may be protected by a boot 256 positioned in covering relation to the cover 258 enclosing spring 232 in the non-pressure head 254 of brake cylinder 214.

The pair of locking assemblies 240 are interconnected to each other by an activating assembly 242 comprising a piston 244 having a tapered edge 246 in contact with a pair of pins 248 so that translation of piston 244 from a non-pressurized position to a pressurized position caused pins 248 move linearly outwardly as the tapered edge 246 gradually pushes against pins 248. Pins 248 extend outwardly from tapered edge 246 of piston 244 into contact with a pair of cams 250. Each cam 250 is mechanically interconnected to each locking sleeve 230 of each locking assembly 240 by a shoulder 252 on the opposing end of cam 250 so that, when rotated, engages a corresponding shoulder 254 on locking sleeve 230 and moves locking sleeve 230 axially out of engagement with locking nut 224. As a result, the linear movement of pins 248 in response to the movement of piston 244 will cause cams 250 to rotate and the rotation of cams 250 will force locking sleeves 230 to move out of engagement with locking nuts 224. Thus, when a source of pressure is applied to or removed from a pressure port 262 associated with the face 260 of piston 244, such as brake pipe pressure, locking assemblies 240 are unlocked or locked, respectively. A manual piston knob 264 may be coupled to piston 244 to allow for a manual application or release of locking assemblies 240.

Figure 8:
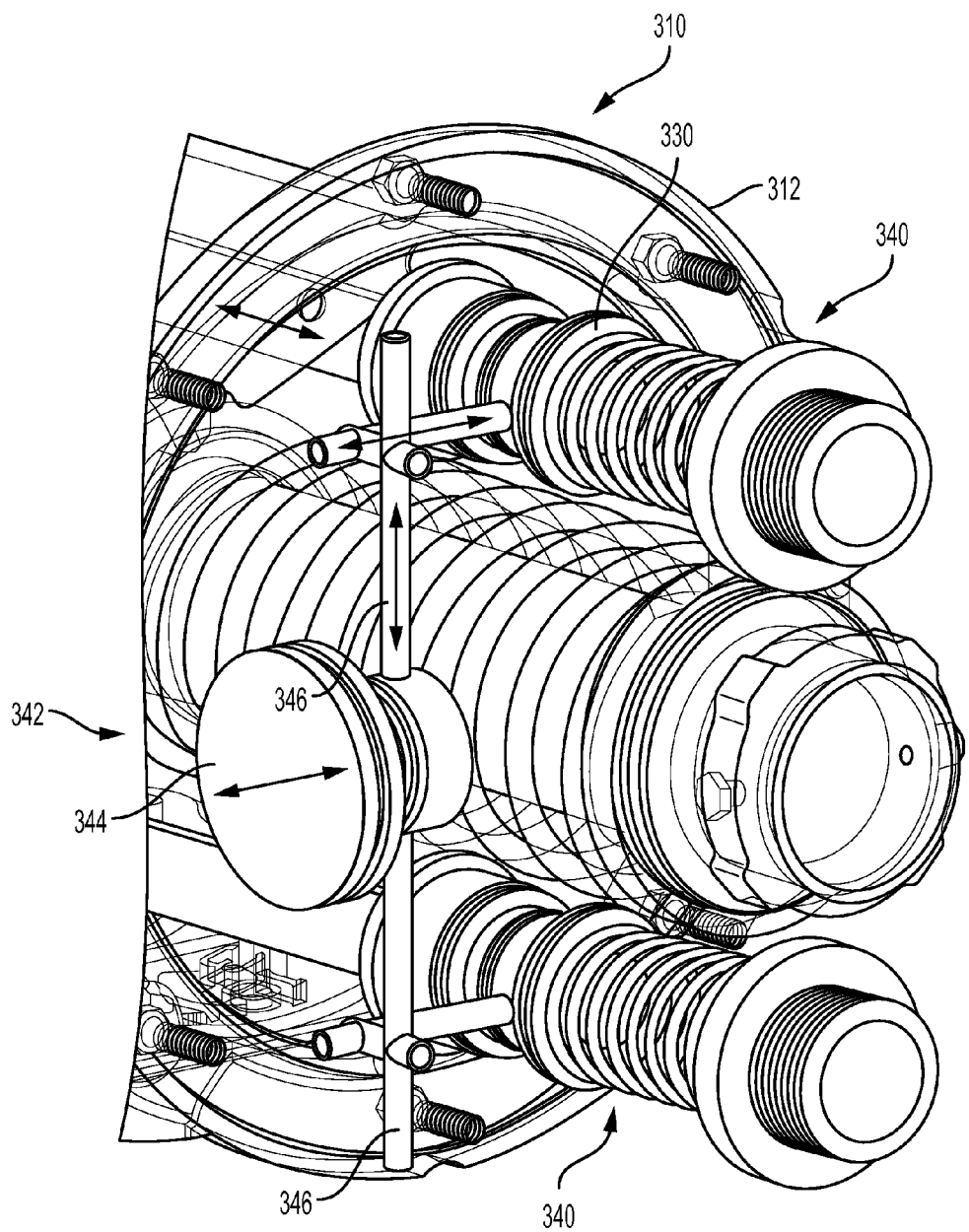
FIG. 8 is a perspective view of an additional automatic parking brake for a body mounted brake cylinder.
Figure 9:
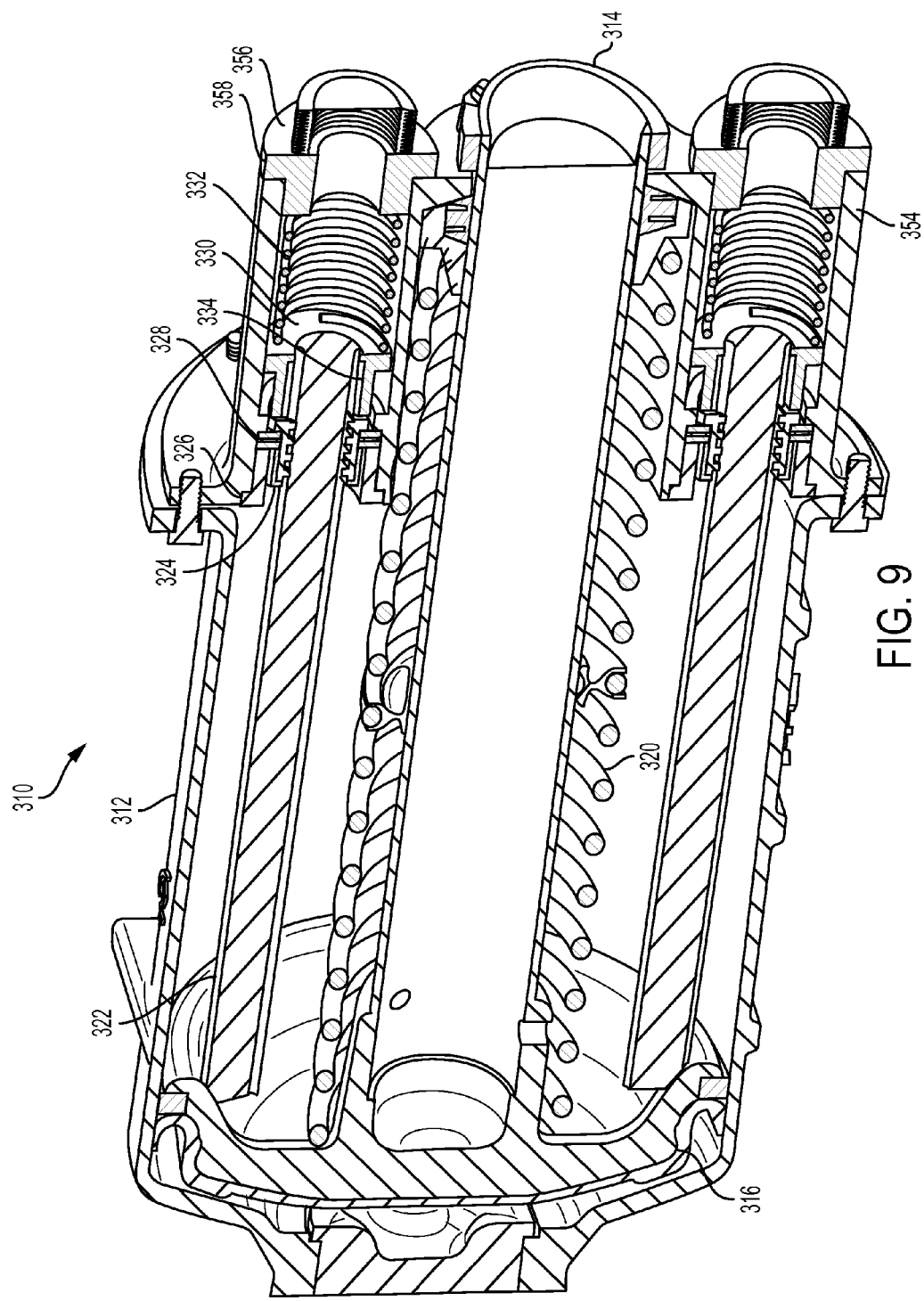
FIG. 9 is a cross-section of the automatic parking brake for a body mounted brake cylinder seen in FIG. 8.
Figure 10:
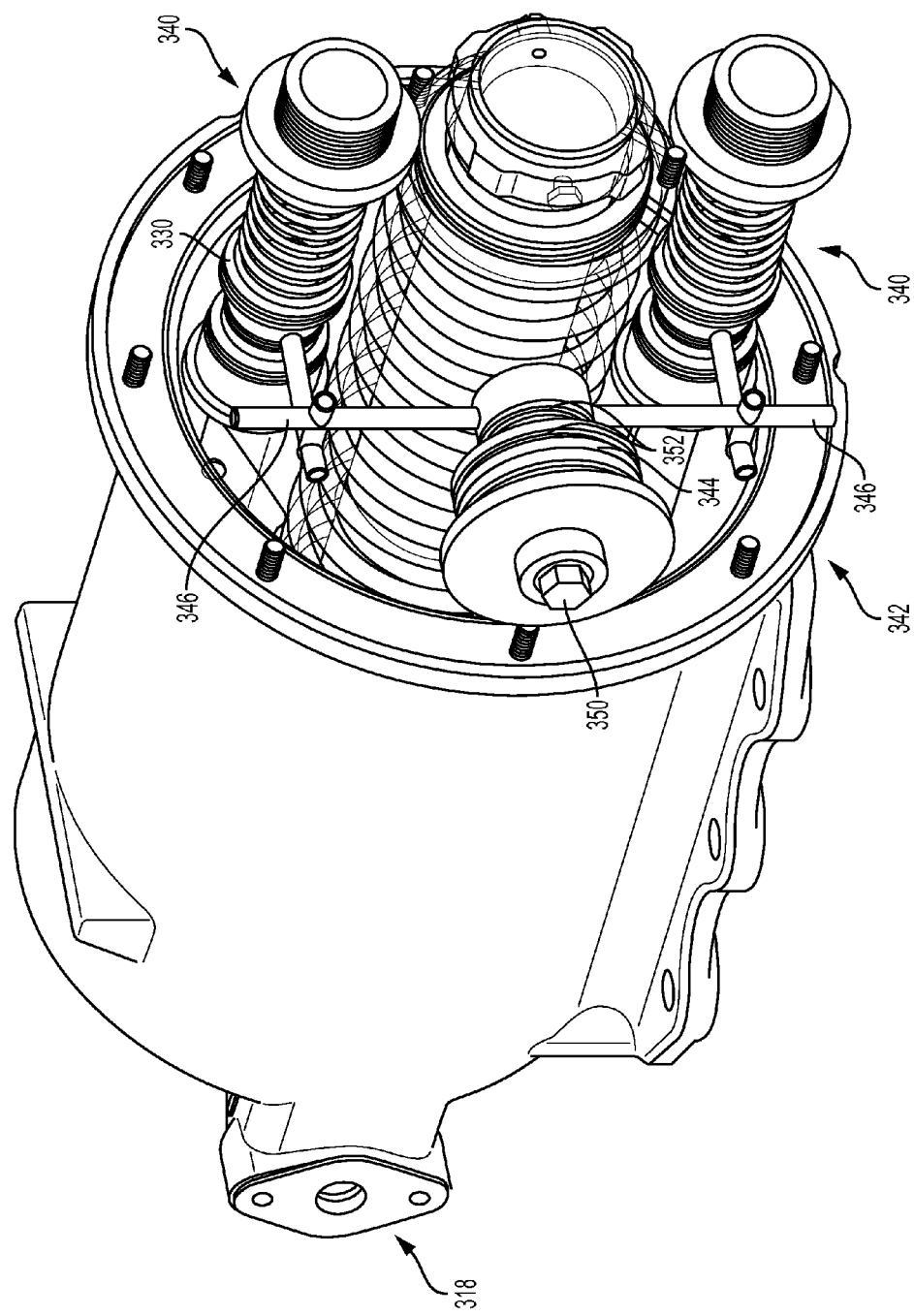
FIG. 10 is a perspective view of the automatic parking brake for a body mounted brake cylinder seen in FIGS. 8 and 9.

There is seen in FIGS. 8 through 10, another embodiment of an automatic parking brake 310 for a body mounted brake cylinder 312 having a pair of locking assemblies 340. Brake cylinder 312 includes a piston 316 that moves in response to pneumatic pressure applied to an inlet 318, such as a source of brake cylinder pressure. A spring 320 biases piston 316 into a brakes released position, and pressure applied to inlet 318 moves piston 316 into the brakes applied position. A piston rod 314 is coupled to the piston 316 at one end and is interconnected to the braking system at the other end.

Each locking assembly 340 comprises a threaded shaft 322 coupled to piston 316 and positioned in parallel with piston rod 314. Threaded shaft 322 is selectively locked and unlocked by the action of a locking nut 324 that is threaded to shaft 322 via high helix threads. A locking sleeve 330 is positioned proximately to locking nut 324 and is rotationally fixed but free to move axially into and out of engagement with locking nut 324. Locking nut 324 is held in place by a bushing 326 and a thrust bearing 328. Locking sleeve 330 is biased into engagement with each locking nut 324 by a spring 332 into a locked position. When engaged with nut 324, locking sleeve 330 prevents nut 324 from rotating, and thereby locking shaft 322 in place. When each sleeve 230 is disengaged from each nut 224, each nut 224 is free to rotate, thereby allowing each shaft 222 to translate between the brakes applied and brakes released position. Each locking assembly 340 may be protected by a boot 356 positioned in covering relation to the cover 358 enclosing spring 332 in the non-pressure head 354 of brake cylinder 314. Pins 334 may be used to prevent rotation of sleeve 330.

Figure 11:
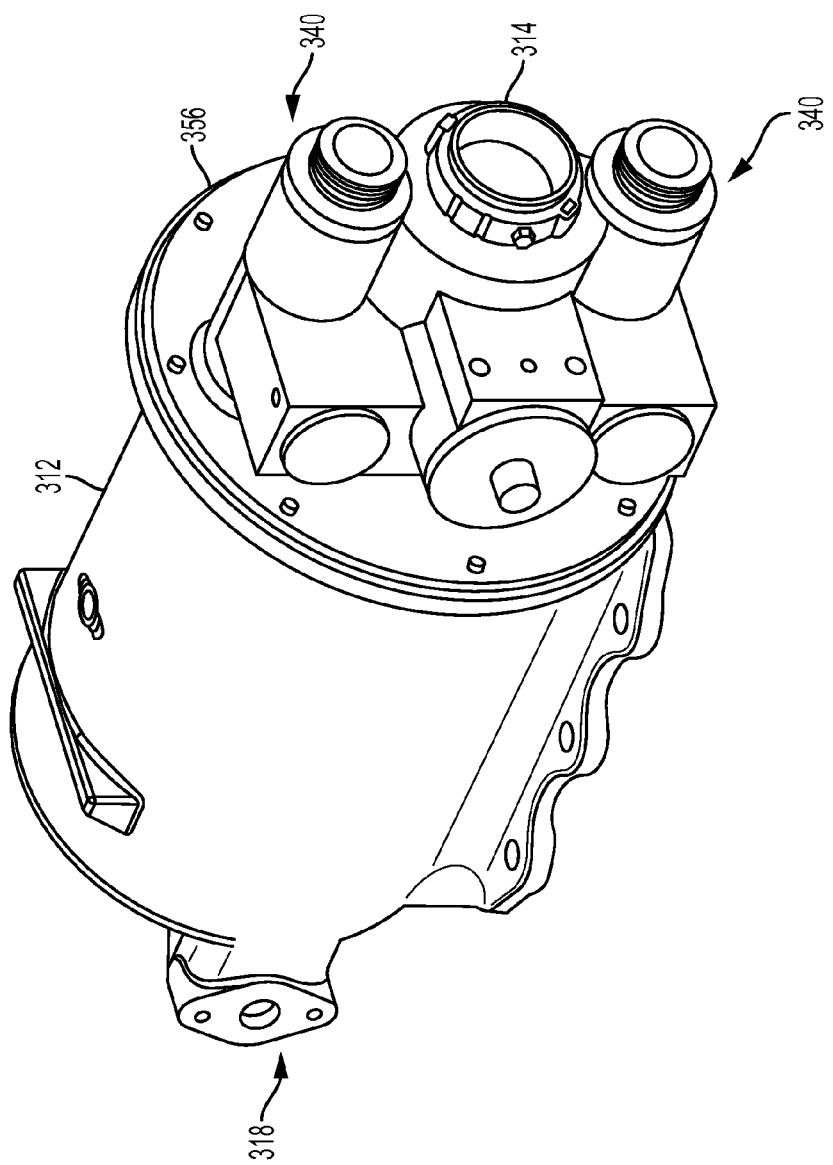
FIG. 11 is a perspective view of the exterior of the automatic parking brake for a body mounted brake cylinder seen in FIGS. 5 through 10.

The pair of locking assemblies 340 are interconnected to each other by an activating assembly 342 comprising a piston 344 that can selectively apply pressure via a pair of conduits 346 directly to locking sleeves 330 to move them out of engagement with the corresponding locking nuts 324. Piston 344 is preferably biased so that no pressure is supplied to locking sleeves 330 and may be automatically actuated, such as by connecting a source of brake pipe pressure, or by providing a manual point of connection to the face 360 of piston 344. Referring to FIG. 10, piston 344 may include a manual release nut 350 that, when rotating, will withdraw piston 344 so that pressure is applied to locking sleeve 330 to move into the disengaged position relative to locking nut 324 so that brake piston 316 may return to the brakes released position. Piston 344 may include one or more O-rings 352 to seal piston 344 within the non-pressure head 354 of brake cylinder 314. FIG. 11 shows the outer structure of a brake cylinder according to FIGS. 5 through 7, or 8 through 10.

What is claimed is:

1. A body mounted brake cylinder having an automatic parking brake, comprising:
   a piston positioned in the brake cylinder and moveable in response to the application of pressure to a port between a first position and a second position;
   a piston rod positioned in abutting relation to the piston for longitudinal movement therewith and for pivoting of the piston rod as the piston moves between the first and second positions;
   a threaded shaft coupled to the piston and enclosing the piston rod; and
   an automatic parking brake locking mechanism coupled to the threaded shaft for preventing movement of the threaded shaft in response to a source of brake pipe pressure applied to the automatic parking brake locking mechanism.

2. The body mounted brake cylinder of claim 1, wherein the automatic parking brake locking mechanism comprises a rotatable locking nut positioned around the threaded shaft and a locking sleeve that is moveable between a locked position, where the locking sleeve engages the locking nut and prevents from the nut from rotating, and a released position, where the locking sleeve is disengages from the locking nut and the locking nut is free to rotate.

3. The body mounted brake cylinder of claim 2, wherein the automatic parking brake locking mechanism further comprises a spring providing a force biasing the locking nut into the locked position and wherein the application of brake pipe pressure will bias the locking sleeve into the released position if the application of brake pipe pressure exceeds the force of the spring.

\* \* \* \* \*